US012770340B2

(12) United States Patent
Smith, Jr.

(10) Patent No.: US 12,770,340 B2
(45) Date of Patent: Oct. 20, 2026

(54) SYSTEM AND METHOD FOR PROVIDING VIRTUAL REALITY EXPERIENCES WITH FAMOUS PERSONALITIES

(71) Applicant: Sigmond Joseph Smith, Jr., Las Vegas, NV (US)

(72) Inventor: Sigmond Joseph Smith, Jr., Las Vegas, NV (US)

( * ) Notice: Subject to any disclaimer, the term of this patent is extended or adjusted under 35 U.S.C. 154(b) by 90 days.

(21) Appl. No.: 18/807,952

(22) Filed: Aug. 17, 2024

(65) Prior Publication Data

US 2024/0412471 A1 Dec. 12, 2024

Related U.S. Application Data

(60) Provisional application No. 63/650,937, filed on May 23, 2024.

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01)

(58) Field of Classification Search
None
See application file for complete search history.

(56) References Cited

U.S. PATENT DOCUMENTS 9,764,225 B1 * 9/2017 Munari ................... A63F 9/181
2009/0017886 A1 * 1/2009 McGucken ............. A63F 13/60 463/1
2012/0088561 A1 * 4/2012 Hohmann ............... A63F 13/10 463/1
2016/0026253 A1 * 1/2016 Bradski ................ H04N 13/128 345/8
2017/0148267 A1 * 5/2017 Parker ................... G07F 17/323
2019/0164346 A1 * 5/2019 Kim ...................... G06T 15/005
2019/0250805 A1 * 8/2019 Brewer ............... G06F 3/04847
2020/0273230 A1 * 8/2020 Amitay ............. H04M 1/72457
2021/0008461 A1 * 1/2021 Anderegg ............. A63J 19/006
2022/0335476 A1 * 10/2022 Abdel-Wahab .... G06Q 30/0255
2023/0334775 A1 * 10/2023 Park ........................ G06T 15/20
2024/0104877 A1 * 3/2024 Henderson .............. G06F 3/011
2024/0212223 A1 * 6/2024 Palamadai .............. G06F 3/011
(Continued)

*Primary Examiner* — Joni Hsu
(74) *Attorney, Agent, or Firm* — Novel Patent Services LLC

(57) ABSTRACT

The present invention relates to a system designed to facilitate interactive experiences with famous personalities using advanced virtual reality (VR) and artificial intelligence (AI) technologies. The system comprises a computing device, which is configured to execute a plurality of modules. These modules include a user interface module for selecting famous personalities and virtual environments, a data acquisition module for retrieving relevant information, a VR module for generating and displaying the virtual experience, an AI module for tailoring interactions, a mixed reality integration module for blending virtual and real-world elements, and a recording module for capturing and storing interactions. This system provides an immersive, personalized entertainment experience by adapting to individual preferences and interactions, eliminating the need for cumbersome VR gear, and offering a wide range of activities and interactions with the famous personalities from various genres.

17 Claims, 6 Drawing Sheets

(56) References Cited

U.S. PATENT DOCUMENTS

| | | | | |
|---|---|---|---|---|
| 2025/0218123 | A1* | 7/2025 | Williams | G06T 17/00 |
| 2025/0345684 | A1* | 11/2025 | Bandawe | A63B 71/0622 |
| 2025/0391138 | A1* | 12/2025 | Walker | A63F 13/211 |

* cited by examiner

SYSTEM AND METHOD FOR PROVIDING VIRTUAL REALITY EXPERIENCES WITH FAMOUS PERSONALITIES

FIELD OF THE INVENTION

The present disclosure relates generally to virtual reality technology, and more particularly to a system that utilizes advanced artificial intelligence (AI) and mixed reality technologies to facilitate dynamic and engaging interactive experiences with famous personalities from various genres, thereby providing an immersive and personalized entertainment environment for users.

BACKGROUND

Virtual Reality (VR) technology has seen significant advancements over the past decade, dramatically transforming the landscape of digital entertainment and interactive experiences. Early VR systems were limited in their scope and functionality, primarily used for gaming and simulations. However, recent innovations have expanded VR's applications to include sophisticated training simulations, immersive educational tools, and interactive entertainment venues.

Despite these advancements, traditional VR experiences often rely on headsets and controllers to immerse users in a virtual environment. While these systems have provided valuable experiences, they frequently fall short in delivering highly personalized and deeply engaging interactions. The lack of integration with real-world elements and the limitation of virtual environments to predefined scenarios can restrict the user's sense of immersion and personal connection.

Family Entertainment Centers (FECs) and similar venues have long been at the forefront of seeking innovative methods to attract and entertain a diverse audience. The introduction of VR technology into these spaces has opened new avenues for interactive entertainment, thereby allowing for more dynamic and engaging experiences. However, even with these advancements, a substantial gap remains in the market for VR systems that offer interactions with famous characters from various genres.

Current solutions generally focus on generic or theme-based experiences without leveraging the appeal of well-known personalities. This gap presents an opportunity for creating VR experiences that capitalize on the widespread popularity of movie stars, music icons, sports figures, and fictional characters, which can significantly enhance user engagement and satisfaction.

Existing VR solutions often provide interactive experiences but typically do not incorporate famous personalities into their content. This omission limits their appeal and engagement potential for a broader audience who may be more interested in interacting with characters they recognize and admire. Additionally, traditional VR setups can be cumbersome, thus requiring the users to wear heavy headsets and use multiple controllers. This equipment can be restrictive and detract from the overall enjoyment and immersion of the experience, thereby making it less accessible and less enjoyable for some users.

To address the aforementioned limitations, there is a need for a system that utilizes advanced artificial intelligence and mixed reality technologies to facilitate dynamic and engaging interactive experiences with famous personalities from various genres, thereby providing an immersive and personalized entertainment environment for users. There is also a need for a system that adapts to individual preferences and interactions by incorporating AI-driven personalization, offering a level of customization and immersion that traditional VR setups cannot match. Additionally, there is a need for a system that eliminates the requirement for users to wear cumbersome VR gear, thereby providing a more seamless and user-friendly experience.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments nor delineate the scope of any or all embodiments.

The present disclosure, in one or more embodiments, relates to a system designed to facilitate interactive experiences with famous personalities through advanced virtual reality (VR) and artificial intelligence (AI) technologies. The system comprises a computing device with a processor and memory, which is connected to a server and a database via a network. The computing device executes a plurality of modules to create an immersive entertainment experience.

In one embodiment herein, the plurality of modules comprises a user interface module that allows a user to select a famous personality and a corresponding virtual environment. The user interface module also provides a selection interface featuring a collection of famous personalities from various genres, such as movie stars, movie characters, music stars, sports stars, sports entertainment figures, television stars, cartoons, superheroes, supervillains, political figures, historical figures, fictional characters, video game characters and mythological figures. Additionally, the user can customize their experience by choosing specific activities such as combat, adventure, mission-based objectives, sports-play, dancing, singing, and dialogue exchange.

In one embodiment herein, the plurality of modules comprises a data acquisition module that retrieves information about the selected famous personalities and virtual environments. The data acquisition module maintains metadata, including biographical details, typical behaviors and signature phrases, and updates the database periodically to include newly available famous personalities and environments.

In one embodiment herein, the plurality of modules comprises a VR module that generates and displays high-fidelity selected famous personalities and the corresponding virtual environments based on user inputs. The VR module supports advanced graphics processing and enables collaborative interactions by allowing multiple users to engage in the same virtual space simultaneously.

In one embodiment herein, the plurality of modules comprises an artificial intelligence (AI) module that enhances personalization by tailoring interactions between the user and the selected famous personality. The artificial intelligence (AI) module enables the famous personality to address the user by name and adapts responses based on personalized details, thereby making the experience more engaging.

In one embodiment herein, the plurality of modules comprises a mixed reality integration module that uses augmented reality (AR) technology to project virtual elements, include character-specific transportation vehicles, vessels, realms, worlds, planets, unique locations, devices, weapons, and accessories, into the user's real-world environment, thereby enhancing the overall immersive and interactive experience.

In one embodiment herein, the plurality of modules comprises a recording module that captures high-resolution video and audio of the user's interactions with the famous personalities. The recording module provides options for users to edit and share their experiences on social media, thereby ensuring that the interactive experiences can be preserved and showcased.

According to an aspect, a method is disclosed for facilitating interactive experiences with famous personalities using the system. First, at one step, the user interface module receives inputs from the user by selecting the famous personality and the corresponding virtual environment. At another step, the data acquisition module retrieves the information about the selected famous personality and the corresponding virtual environment. At another step, the virtual reality (VR) module generates and displays the selected famous personality and the corresponding virtual environment based on the user's inputs.

At another step, the artificial intelligence (AI) module tailors interactions between the user and the selected famous personality according to the user inputs and preferences. At another step, the mixed reality integration module blends the virtual elements with real-world environments to enhance the immersive experience. Further, at another step, the recording module captures and stores one or more video and photographic records of the user's interactions with the famous personalities.

In another exemplary embodiment, a non-transitory computer-readable medium stores instructions that, when executed by a processor, cause the processor to perform a method for facilitating interactive experiences with famous personalities. The method comprises several steps. Initially, the processor receives one or more inputs from the user who selects the famous personality and the corresponding virtual environment. Subsequently, the processor retrieves information about the selected famous personality and the corresponding virtual environment. The processor then generates and displays the selected famous personality and the corresponding virtual environment based on the user's inputs.

Following this, the processor tailors interactions between the user and the selected famous personality according to the user inputs and preferences. In addition, the processor blends virtual elements with real-world environments to enhance the immersive experience. Finally, the processor captures and stores one or more video and photographic records of the user's interactions with the famous personalities.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1:
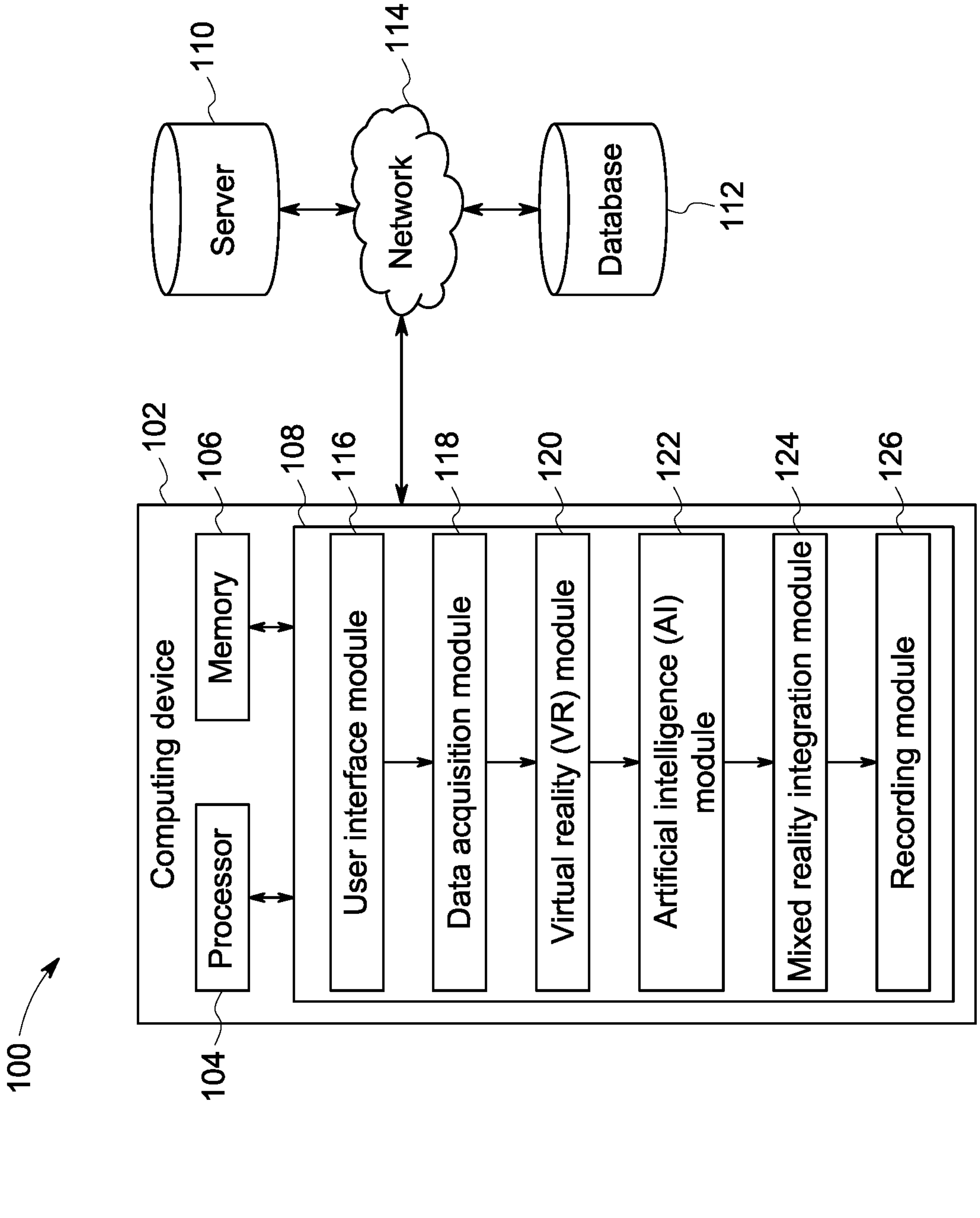
FIG. 1 illustrates a block diagram of a system for facilitating interactive experiences with famous personalities, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1 refers to a block diagram of a system 100 for facilitating interactive experiences with famous personalities. In one embodiment herein, the system 100 utilizes advanced artificial intelligence and mixed reality technologies to facilitate dynamic and engaging interactive experiences with the famous personalities from various genres, thereby providing an immersive and personalized entertainment environment for users. The system 100 adapts to individual preferences and interactions by incorporating AI-driven personalization, thus offering a level of customization and immersion that traditional VR setups cannot match. Additionally, the system 100 eliminates the requirement for users to wear cumbersome VR gear, thereby providing a more seamless and user-friendly experience.

In one embodiment herein, the system 100 is configured to facilitate interactive experiences with the famous personalities through the integration of advanced virtual reality (VR) and artificial intelligence (AI) technologies. The system 100 is structured to provide an immersive and personalized entertainment experience by utilizing a computing device 102. In one embodiment herein, the computing device 102 comprises a processor 104 and a memory 106. The processor 104 is configured to execute one or more instructions stored in the memory 106, thereby performing the necessary computations to manage and operate a plurality of modules 108. The computing device 102 is connected to a server 110 and a database 112 via a network 114. This connection ensures real-time data exchange and processing, thereby maintaining the responsiveness and interactivity of the system 100.

In one embodiment herein, the server 110 handles the backend processes by managing data flow between the computing device 102 and the database 112. The server 110 ensures that the system 100 remains synchronized and updates are applied seamlessly. In one embodiment herein, the database 112 stores extensive metadata related to each famous personality, including biographical details, behaviors, and signature phrases. This information is crucial for rendering realistic and engaging interactions.

In one embodiment herein, the plurality of modules 108 comprises a user interface module 116 that is configured to receive inputs from users by allowing them to select a famous personality and a corresponding virtual environment. The user interface module 116 presents a selection interface displaying a collection of famous personalities from various genres, including but not limited to movie stars, movie characters, music stars, sports stars, sports entertainment figures, television stars, cartoons, superheroes, supervillains, political figures, historical figures, fictional characters, video game characters, and mythological figures. The users can customize their experience by selecting specific activities and interactions, including combat, adventure, mission-based objectives, sports-play, dancing, singing, and dialogue exchange with the chosen famous personalities.

In one embodiment herein, the plurality of modules 108 comprises a data acquisition module 118 that is configured to retrieve and process the information about the selected famous personality and virtual environment. The data acquisition module 118 accesses the database 112 to fetch metadata related to the famous personality, thereby ensuring that the interactions are accurate and reflective of the famous personalities.

In one embodiment herein, the plurality of modules 108 comprises a virtual reality (VR) module 120 that is configured to generate and display the selected famous personality and the corresponding virtual environment, virtual reality (VR) module 120 creates high-fidelity, immersive virtual worlds. The VR module 120 supports multiple users within the same environment, thereby enabling collaborative and shared experiences.

In one embodiment herein, the plurality of modules 108 comprises an artificial intelligence (AI) module 122 that is configured to tailor interactions between the user and the selected famous personality based on user inputs and preferences. The AI module 122 analyzes user behavior to provide real-time feedback and adapt the famous personality's responses, thereby creating a natural and engaging experience. Additionally, the AI module 122 personalizes interactions by enabling the famous personality to address the user by name.

In one embodiment herein, the VR module 118 and the AI module 122 are responsible for incorporating familiar clothing and apparel associated with the selected characters into the virtual experience, thereby ensuring that any specific outfits, uniforms, or distinctive apparel relevant to these characters are accurately represented in the virtual environment. The VR module 118 creates high-fidelity, immersive virtual worlds where these details are rendered with precision, while the AI module 122 tailors the character's appearance to match their iconic wardrobe and attire. This collaboration enables the users to fully engage with the characters in the environments that reflect their signature looks and styles, thus enhancing the authenticity and depth of the interaction. By integrating these elements, the system 100 provides a more immersive experience that faithfully represents the characters' visual identities, thereby enriching the overall user experience with added layers of realism and personalization.

In one embodiment herein, the plurality of modules 108 comprises a mixed reality integration module 124 that is configured to utilize augmented reality (AR) technology to project virtual elements into the user's real-world environment. The mixed reality integration module 124 can include a range of virtual components such as character-specific transportation vehicles, vessels, realms, worlds, planets, unique locations, devices, weapons, and accessories. By overlaying these elements onto the physical world, the AR technology enriches the user's experience, thereby allowing for an immersive and interactive interaction with both real and virtual elements. The mixed reality integration module 124 enhances the user's engagement by enabling real-time interactions with virtual objects that seamlessly blend with the actual surroundings. This integration not only provides a visually captivating experience but also supports dynamic interactions, where users can manipulate and interact with virtual items as if they were physically present.

In one embodiment herein, the mixed reality integration module 124, in combination with the AI module 122, incorporates familiar worlds, planets, realms, and significant locations associated with the characters or historical events, thereby ensuring that the users are fully immersed in environments that accurately reflect the unique attributes and contexts of their chosen interactions. The AI module 122 further enhances this experience by integrating special attributes, powers, and abilities unique to the characters or notable features of the historical events, thereby enriching the realism and depth of the interactions. The collaboration between the mixed reality integration module 124 and the AI module 122 merges diverse and dynamic elements, thereby offering the users a highly personalized and immersive experience. This allows for interaction with both fictional and real-world contexts in innovative ways, thus representing a significant advancement in immersive entertainment and educational technology.

In one embodiment herein, the plurality of modules 108 comprises a recording module 126 that is configured to capture high-resolution video and audio of the user's interactions with the virtual famous personalities. The recording module 126 may offer options for the users to edit and share their recorded experiences on social media platforms, thereby preserving the memorable interactions.

In one embodiment herein, the system 100 is versatile and can be utilized in a variety of settings to maximize its reach and impact. The system 100 is ideally suited for family entertainment centers, amusement parks, and other entertainment venues where large groups of people seek engaging and novel experiences. Additionally, the system 100 can be deployed in educational institutions for interactive learning experiences, museums for immersive exhibits, and corporate events for unique team-building activities. The system's adaptability also allows for installation in dedicated VR arcades, shopping malls, and even private homes, thereby providing the users with an unparalleled level of convenience and accessibility. By offering a wide range of potential applications, the system 100 ensures that users from diverse backgrounds and interests can enjoy its innovative and immersive features.

In one embodiment herein, the inclusion of historical, political, and mythological characters within the system 100 extends beyond entertainment and serves for an educational purpose. These characters can be effectively leveraged in educational museums, observatories, and learning institutions to create immersive and interactive learning experiences for young people. By incorporating such figures into virtual environments, the system 100 enables the users, particularly young students, to engage with history, politics, and mythology in a more dynamic and compelling manner than traditional educational methods.

For example, the students can virtually meet historical leaders, explore their lives and contributions, and experience key historical events directly, thereby providing a deeper understanding and appreciation of these subjects. This immersive approach allows the students to witness pivotal moments in history as if they were present, thereby enhancing their grasp of historical context and its relevance to modern times. Similarly, the mythological characters can be utilized to teach cultural stories, beliefs, and values, thereby helping to preserve and impart cultural heritage to future generations in an engaging and memorable way. In observatories, the political figures could be showcased to explain significant political movements and ideologies, thereby making complex concepts more relatable and understandable. By interacting with these figures and scenarios in a controlled, virtual environment, the students can develop a nuanced understanding of different worldviews, thereby fostering critical thinking and a broader perspective on global history and culture.

In one exemplary embodiment herein, the operation of the system 100 is disclosed in a step-by-step process. Initially, the user arrives at the venue where the system 100 is deployed. The venue staff assists the user in getting acquainted with the rules and policies of the establishment. The user is then guided to the designated area where the system 100 is set up. This area is equipped with the necessary VR and AR hardware, thereby ensuring that the user has the appropriate space and equipment to engage with the virtual environment effectively. Notably, the system 100 is designed so that the user does not need to wear any cumbersome VR gear or devices, thereby providing a more seamless and user-friendly experience.

Figure 2:
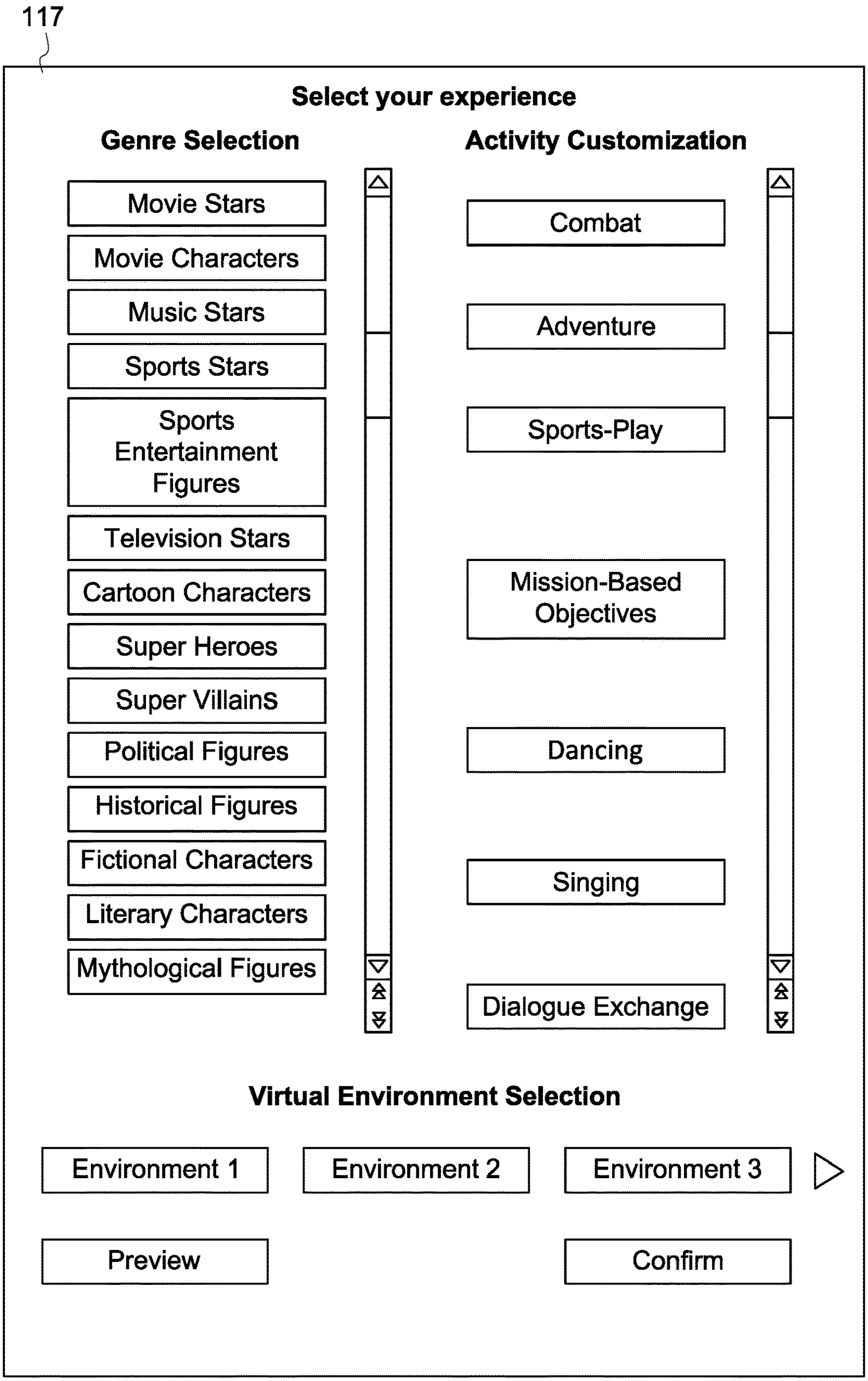
FIG. 2 illustrates an exemplary pictorial representation of a selection interface presented by a user interface module, in accordance with embodiments of the invention.

FIG. 2 refers to an exemplary pictorial representation of the selection interface 117 presented by the user interface module 116. In one embodiment herein, the user interface module 116 begins the process by displaying the selection interface 117 to the user. This selection interface 117 showcases a comprehensive array of famous personalities from various genres, including but not limited to movie stars, movie characters, music artists, sports figures, sports entertainment personalities, television stars, cartoons, superheroes, supervillains, political figures, historical figures, fictional characters, video game characters, and mythological figures. The users can browse through these categories to select their preferred personality. Moreover, the selection interface 117 enables the users to choose the corresponding virtual environment for the interaction. The selection interface 117 also allows the users to customize their experience by selecting specific activities and interactions, such as combat, adventure, mission-based objectives, sports-play, dancing, singing, dialogue exchange, historical reenactments, and real-world events. This extensive customization ensures that each interaction is uniquely tailored to individual preferences and interests, providing a highly personalized and engaging experience.

Once the user has made their selections, the data acquisition module 118 retrieves detailed information about the chosen famous personality and virtual environment. The data acquisition module 118 accesses the database 112 to fetch metadata related to the selected famous personality, including biographical information, typical behaviors, and signature phrases. The retrieval of this data is crucial for creating realistic and engaging interactions. The data acquisition module 118 also ensures that the database 112 is periodically updated to include newly available famous personalities and environments, thereby keeping the system 100 up-to-date.

Figure 3A:
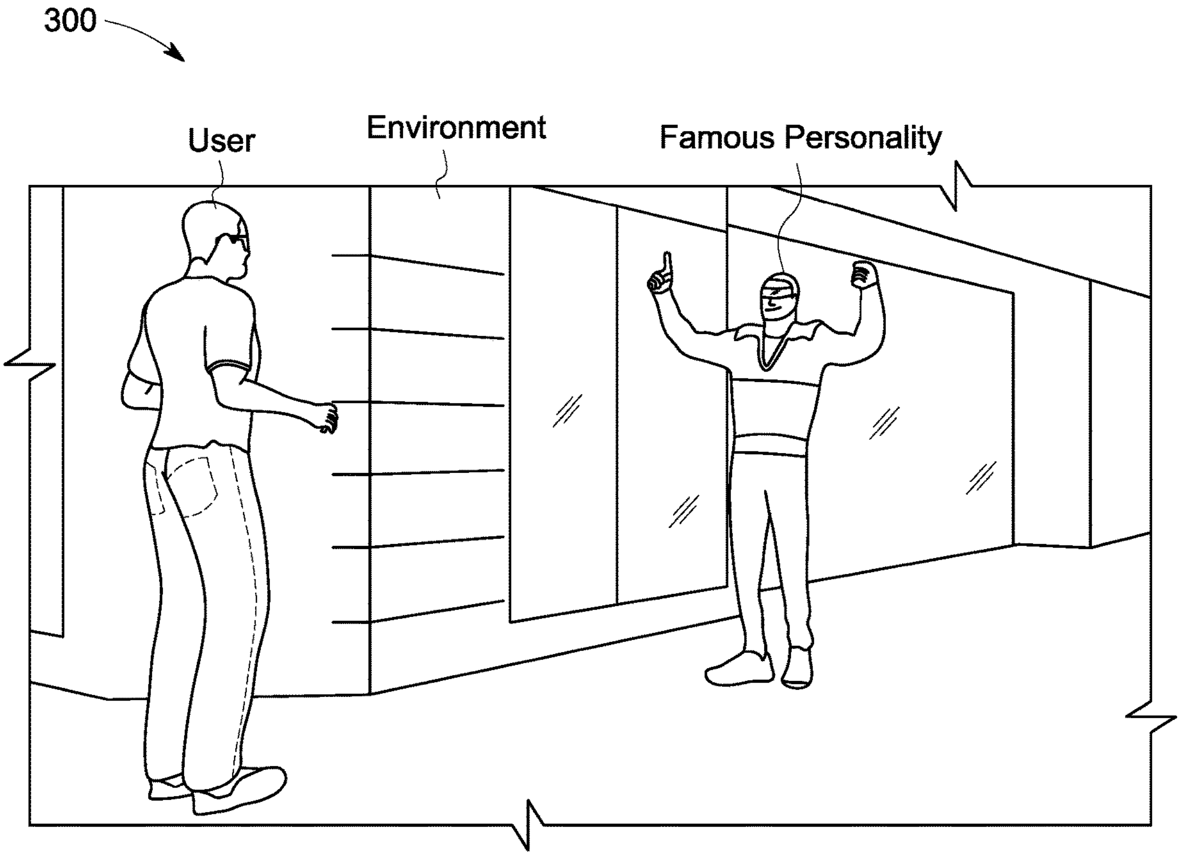
FIG. 3A illustrates an exemplary pictorial representation depicting a user interacting with a famous personality, for example, a celebrity musician in accordance with embodiments of the invention.
Figure 3B:
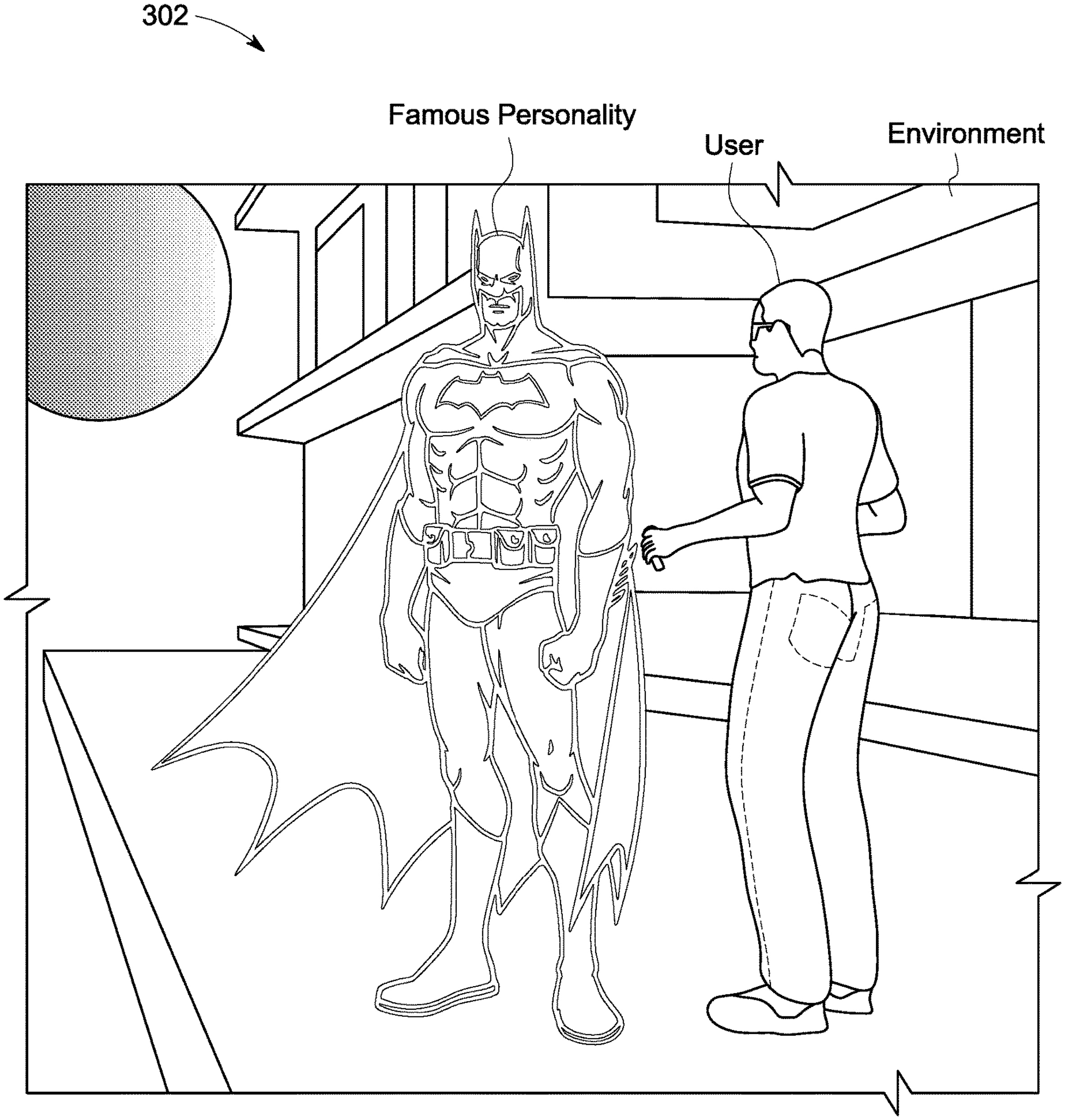
FIG. 3B illustrates an exemplary pictorial representation depicting a user interacting with a famous personality, for example, a fictional superhero character in accordance with embodiments of the invention.
Figure 3C:
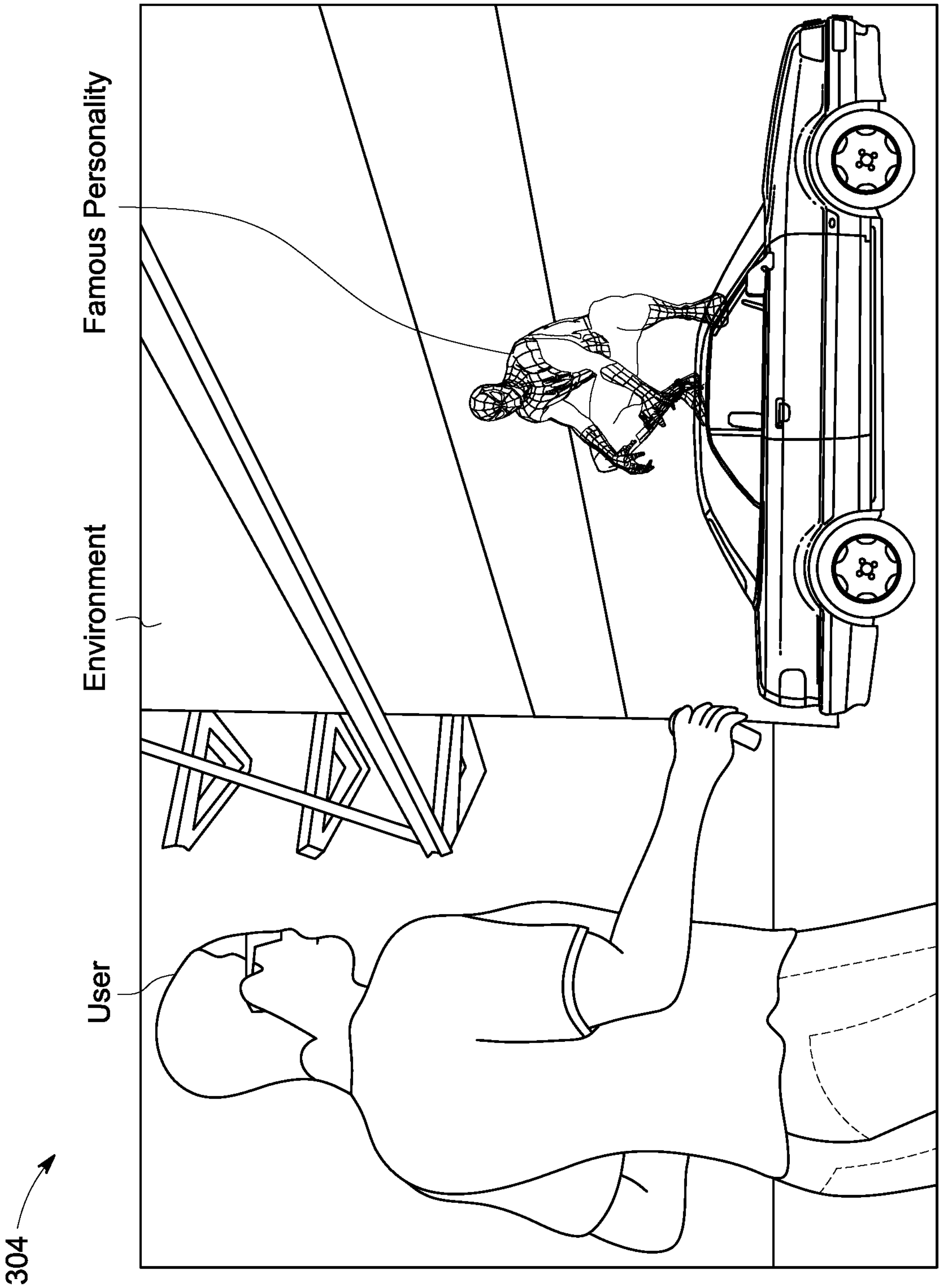
FIG. 3C illustrates an exemplary pictorial representation depicting a user interacting with a famous personality, for example, another fictional superhero character in accordance with embodiments of the invention.

FIG. 3A refers to an exemplary pictorial representation depicting a user interacting with a famous personality, for example, a celebrity musician. FIG. 3B refers to an exemplary pictorial representation depicting a user interacting with a famous personality, for example, a fictional superhero character. FIG. 3C refers to an exemplary pictorial representation depicting a user interacting with a famous personality, for example, another fictional superhero character. Referring to FIG. 3A, FIG. 3B, and FIG. 3C, the virtual reality (VR) module 120 generates the selected virtual environment and renders the chosen famous personality. In one embodiment herein, the virtual reality (VR) module 120 creates high-fidelity, immersive virtual worlds that captivate the user by utilizing the advanced graphics processing techniques. The VR module 120 supports multiple users simultaneously within the same virtual environment, thereby allowing for collaborative and shared interactions. This capability enhances the social aspect of the experience, thus enabling the users to interact not only with virtual famous personalities but also with each other in a shared virtual space.

Later, the AI module 122 tailors the interactions between the user and the selected famous personality. The AI module 122 dynamically adjusts the famous personality's responses and actions based on the user's inputs and preferences. The AI module 122 provides immediate feedback by analyzing user behavior in real-time, thereby adapting the virtual famous personality's interactions to create a more natural and engaging experience. One of the standout features of the AI module 122 is its ability to personalize interactions by enabling the selected famous personality to address the user by name. This level of personalization significantly enhances the immersive experience, thereby making the user to feel directly connected to the virtual famous personality.

Later, the mixed reality integration module 124 blends virtual elements with the user's real-world environment to further augment the immersive experience. The mixed reality integration module 124 utilizes augmented reality (AR) technology to project virtual elements into the physical space around the user. The mixed reality integration module 124 enables seamless interactions between them by synchronizing virtual and real-world objects. This integration allows users to interact with virtual elements as if they were part of the real world, thereby creating a more convincing and immersive experience. The combination of VR and AR technologies, often referred to as mixed reality, provides a unique and compelling user experience.

Later, the recording module 126 captures the entire interactive experience, including high-resolution video and audio of the user's interactions with the virtual famous personalities. The recording module 126 may provide the users with options to edit their recorded experiences, thereby adding personal touches before sharing them on social media platforms. The ability to capture and share these experiences not only enhances the user's enjoyment but also serves as a powerful marketing tool, as users can promote the system through their shared content.

In one embodiment herein, the system 100 offers significant commercial advantages that position it as a highly attractive investment in the entertainment industry. The virtual reality (VR) and augmented reality (AR) markets are experiencing rapid growth, with the family entertainment centers segment projected to reach unprecedented levels. The introduction of the system 100 that combines VR, AR, and artificial intelligence (AI) to offer interactive experiences with the famous personalities caters to this expanding market. The system 100 not only meets the current demand but also sets the stage for future innovations and enhancements. The system 100 provides multiple avenues for generating revenue. Ticket sales for the immersive experiences can be a primary source of income. Additionally, the system 100 offers opportunities for in-app purchases, such as exclusive interactions and personalized merchandise featuring the user's virtual experience. The ability to capture and share experiences on the social media can also drive the revenue through advertising and sponsorship deals.

In one embodiment herein, the system's unique capability to feature interactions with the famous personalities from various genres makes it an attractive platform for celebrity endorsements and partnerships. High-profile celebrities can promote the system 100, thereby increasing its visibility and appeal. The potential for collaborations with movie studios, music labels, and sports organizations further enhances its commercial viability. The system 100 can be franchised to entrepreneurs and entertainment centers worldwide once it is established. This franchising potential allows for rapid expansion and scaling, thus enabling the system 100 to reach a global audience. The franchising model also ensures consistent quality and experience across different locations, maintaining the system's brand reputation.

In one embodiment herein, the system 100 boasts several technical advantages that set it apart from existing solutions in the market. The ability of the data acquisition module 118 is to store and update metadata related to each famous personality ensures that the system 100 remains up-to-date. The periodic updates to the database 112 allow for the inclusion of newly available famous personalities and environments, thereby keeping the user experience fresh and engaging. This comprehensive data management is crucial for maintaining the system's relevance and appeal over time. The VR module 120 uses advanced graphics processing techniques to render high-fidelity, immersive virtual environments. This technical proficiency ensures that the visual and auditory elements of the experience are of the highest quality, thereby captivating the users and enhancing their enjoyment. The system's support for multiple users within the same virtual environment also enables collaborative and social interactions.

In one embodiment herein, the integration of AI technologies allows for a highly personalized user experience. The AI module 122 tailors interactions based on user inputs and preferences, thereby making each experience unique. The system's ability to enable virtual famous personalities to address users by name and adapt their responses in real-time enhances the sense of immersion and personalization. The system 100 offers a mixed reality experience that blurs the line between the virtual and real worlds by combining VR and AR technologies. The mixed reality integration module 124 synchronizes virtual elements with the user's physical environment, thereby enabling seamless interactions. This capability provides a more convincing and engaging experience compared to traditional VR systems.

In one embodiment herein, the capability of the recording module 126 is to capture high-resolution video and audio of the user's interactions that provides the users with lasting memories of their experiences. The option to edit and share these recordings on social media platforms enhances user engagement and satisfaction. The recorded content also serves as a valuable marketing tool, thereby promoting the system 100 to a broader audience.

In one embodiment herein, the system 100 is designed to be applicable to any and all metaverse technologies, both current and future. The system 100 aims to seamlessly integrate with evolving digital landscapes, providing a versatile framework that can adapt to the advancements in virtual, augmented, and mixed reality technologies. The system's architecture is built to support diverse metaverse platforms, enabling users to access and interact with immersive experiences across various virtual environments, social spaces, and digital ecosystems. As the metaverse continues to evolve, the flexibility and scalability of this project ensure that it remains relevant and capable of incorporating new technological innovations, user interfaces, and interaction models. This adaptability positions the project as a forward-thinking solution that not only meets the current demands of immersive entertainment and education but also anticipates and accommodates future developments in metaverse technology, thereby making it a comprehensive tool for the next generation of digital experiences.

Figure 4:
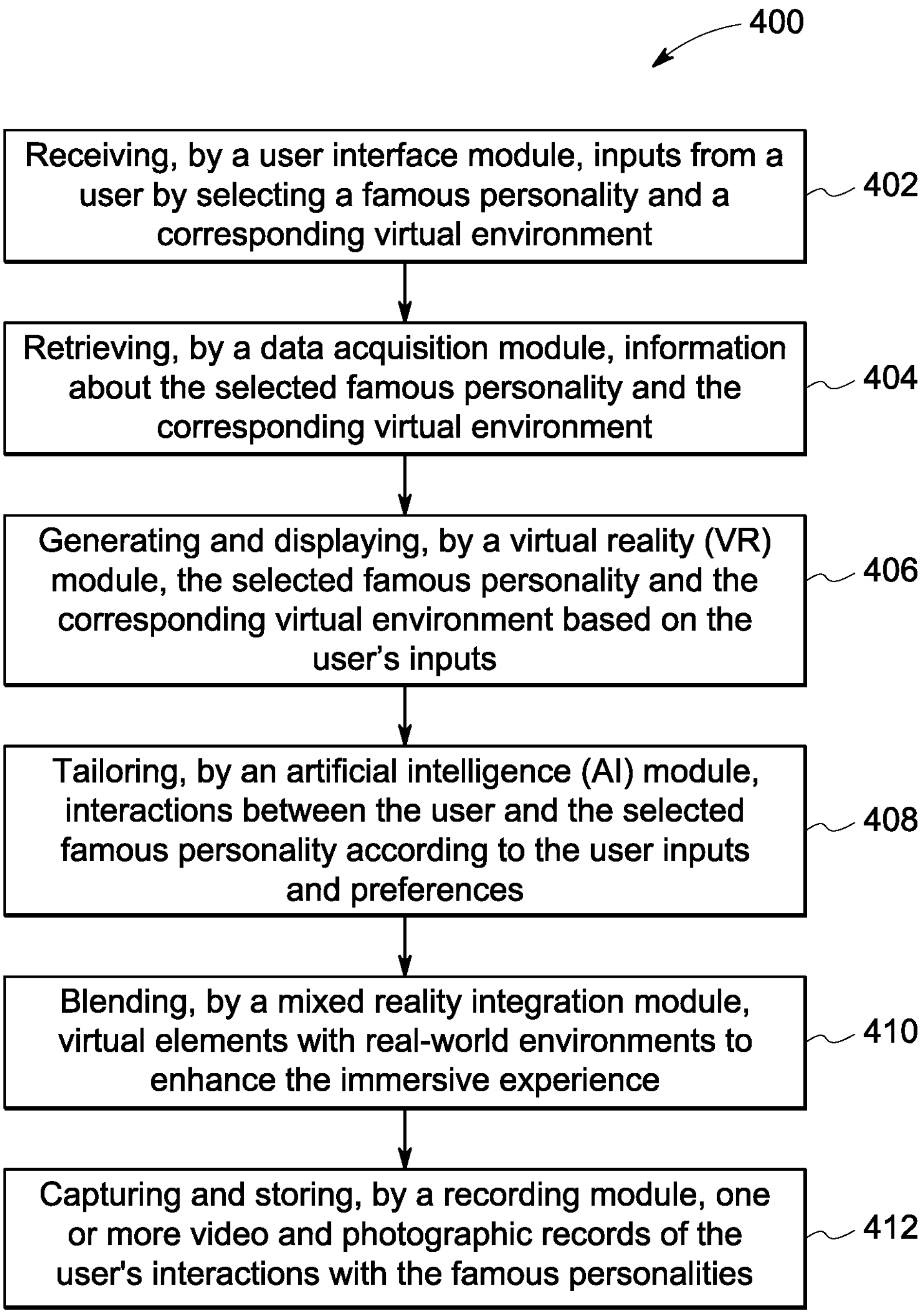
FIG. 4 illustrates a flowchart of a method for facilitating interactive experiences with famous personalities using the system, in accordance with embodiments of the invention.

FIG. 4 refers to a flowchart 400 of a method for facilitating interactive experiences with famous personalities using the system 100. First, at step 402, the user interface module 116 receives inputs from the user by selecting the famous personality and the corresponding virtual environment. At step 404, the data acquisition module 118 retrieves information about the selected famous personality and the corresponding virtual environment. At step 406, the virtual reality (VR) module 120 generates and displays the selected famous personality and the corresponding virtual environment based on the user's inputs.

At step 408, the artificial intelligence (AI) module 122 tailors interactions between the user and the selected famous personality according to the user inputs and preferences. At step 410, the mixed reality integration module 124 blends the virtual elements with the real-world environments to enhance the immersive experience. Further, at step 412, the recording module 126 captures and stores one or more video and photographic records of the user's interactions with the famous personalities.

In another exemplary embodiment, a non-transitory computer-readable medium stores instructions that, when executed by a processor, cause the processor to perform a method for facilitating interactive experiences with the famous personalities. The method comprises several steps. Initially, the processor receives one or more inputs from the user who selects the famous personality and the corresponding virtual environment. Subsequently, the processor retrieves information about the selected famous personality and the corresponding virtual environment. The processor then generates and displays the selected famous personality and the corresponding virtual environment based on the user's inputs.

Following this, the processor tailors interactions between the user and the selected famous personality according to the user inputs and preferences. In addition, the processor blends virtual elements with real-world environments to enhance the immersive experience. Finally, the processor captures and stores one or more video and photographic records of the user's interactions with the famous personalities.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The invention claimed is:

1. A system for facilitating interactive experiences with famous personalities, comprising:

a computing device having a processor and a memory in communication with said processor configured to store one or more instructions executable by said processor, wherein said computing device is in communication with a server and a database via a network, wherein execution of the one or more instructions causes the processor to:

receive, via a selection interface that displays a collection of famous personalities from a plurality of genres and that displays a plurality of corresponding virtual environments, user input selecting a famous personality from the displayed collection and selecting a corresponding virtual environment from the displayed plurality of corresponding virtual environments;

retrieve information about the selected famous personality and the corresponding virtual environment from the database;

generate and display the selected famous personality and the corresponding virtual environment based on the user input;

analyze user behavior in real time to provide feedback and adapt responses of the selected famous personality during the interaction;

utilize augmented reality technology to project character-specific virtual elements that are associated with the selected famous personality into physical space around the user and synchronize the character-specific virtual elements and real-world objects such that the user interacts with the character-specific virtual elements as if the character-specific virtual elements are part of the real world; and capture and store one or more video and photographic records of the interaction with the selected famous personality, wherein the display of the selected famous personality and the corresponding virtual environment, and the projection of the character-specific virtual elements, are performed without requiring the user to wear a headset or to operate a handheld controller.

2. The system of claim 1, wherein the collection of famous personalities displayed by the selection interface comprises movie stars, movie characters, music stars, sports stars, sports entertainment figures, television stars, cartoons, superheroes, supervillains, political figures, historical figures, fictional characters, video game characters, and mythological figures.

3. The system of claim 2, wherein the selection interface presents a plurality of selectable activity types comprising combat, adventure, mission-based objectives, sports-play, dancing, singing, dialogue exchange, historical reenactments, and real-world events, and allows the user to customize the interaction by selecting at least one of the presented plurality of selectable activity types for interaction with the selected famous personality.

4. The system of claim 1, wherein the retrieved information comprises metadata including biographical information, typical behaviors, and signature phrases, and wherein the processor is further configured to execute a data acquisition module that periodically updates the database to include newly available famous personalities and newly available virtual environments.

5. The system of claim 1, wherein the processor is further configured to render high-fidelity, immersive virtual environments using advanced graphics processing techniques, and support multiple users simultaneously within the same virtual environment for collaborative interactions.

6. The system of claim 1, wherein adapting responses of the selected famous personality during the interaction includes enabling the selected famous personality to address the user by name based on personalized details.

7. The system of claim 1, wherein the projected character-specific virtual elements include character-specific transportation vehicles, vessels, realms, worlds, planets, unique locations, devices, weapons, and accessories that are associated with the selected famous personality, and wherein the synchronizing of the character-specific virtual elements and real-world objects enables real-time interaction with the projected character-specific virtual elements as if the projected character-specific virtual elements are physically present.

8. The system of claim 1, wherein the captured interaction comprises high-resolution video and audio of the user's interaction with the selected famous personality, and the system provides options to edit the captured interaction before sharing the captured interaction on a social media platform.

9. A method for facilitating interactive experiences with famous personalities using a system, comprising:

receiving, via a selection interface that displays a collection of famous personalities from a plurality of genres and that displays a plurality of corresponding virtual environments, user input selecting a famous personality from the displayed collection and selecting a corresponding virtual environment from the displayed plurality of corresponding virtual environments;

retrieving information about the selected famous personality and the corresponding virtual environment from a database;

generating and displaying the selected famous personality and the corresponding virtual environment based on the user input;

analyzing user behavior in real time to provide feedback and adapting responses of the selected famous personality during the interaction;

utilizing augmented reality technology to project character-specific virtual elements that are associated with the selected famous personality into physical space around the user and synchronizing the character-specific virtual elements and real-world objects such that the user interacts with the character-specific virtual elements as if the character-specific virtual elements are part of the real world; and capturing and storing one or more video and photographic records of the interaction with the selected famous personality, wherein the displaying of the selected famous personality and the corresponding virtual environment, and the projecting of the character-specific virtual elements, are performed without requiring the user to wear a headset or to operate a handheld controller.

10. The method of claim 9, wherein the collection of famous personalities displayed by the selection interface comprises movie stars, movie characters, music stars, sports stars, sports entertainment figures, television stars, cartoons, superheroes, supervillains, political figures, historical figures, fictional characters, video game characters, and mythological figures.

11. The method of claim 10, wherein the selection interface presents a plurality of selectable activity types comprising combat, adventure, mission-based objectives, sportsplay, dancing, singing, dialogue exchange, historical reenactments, and real-world events, and allows the user to customize the interaction by selecting at least one of the presented plurality of selectable activity types for interaction with the selected famous personality.

12. The method of claim 9, wherein the retrieved information comprises metadata including biographical information, typical behaviors, and signature phrases, the method further comprising periodically updating the database, by a data acquisition module, to include newly available famous personalities and newly available virtual environments.

13. The method of claim 9, further comprising rendering high-fidelity, immersive virtual environments using advanced graphics processing techniques, and supporting multiple users simultaneously within the same virtual environment for collaborative interactions.

14. The method of claim 9, wherein adapting responses of the selected famous personality during the interaction includes enabling the selected famous personality to address the user by name based on personalized details.

15. The method of claim 9, wherein the projected character-specific virtual elements include character-specific transportation vehicles, vessels, realms, worlds, planets, unique locations, devices, weapons, and accessories that are associated with the selected famous personality, and wherein the synchronizing of the character-specific virtual elements and real-world objects enables real-time interaction with the projected character-specific virtual elements as if the projected character-specific virtual elements are physically present.

16. The method of claim 9, further comprising capturing high-resolution video and audio of the user's interaction with the selected famous personality, and providing options to edit the captured interaction before sharing the captured interaction on a social media platform.

17. A non-transitory computer-readable medium storing instructions that, when executed by a processor, cause the processor to:

receive, via a selection interface that displays a collection of famous personalities from a plurality of genres and that displays a plurality of corresponding virtual environments, user input selecting a famous personality from the displayed collection and selecting a corresponding virtual environment from the displayed plurality of corresponding virtual environments;

retrieve information about the selected famous personality and the corresponding virtual environment from a database;

generate and display the selected famous personality and the corresponding virtual environment based on the user input;

analyze user behavior in real time to provide feedback and adapt responses of the selected famous personality during the interaction;

utilize augmented reality technology to project character-specific virtual elements that are associated with the selected famous personality into physical space around the user and synchronize the character-specific virtual elements and real-world objects such that the user interacts with the character-specific virtual elements as if the character-specific virtual elements are part of the real world; and capture and store one or more video and photographic records of the interaction with the selected famous personality, wherein the display of the selected famous personality and the corresponding virtual environment, and the projection of the character-specific virtual elements, are performed without requiring the user to wear a headset or to operate a handheld controller.

* * * * *